United States Patent
Yang et al.

(10) Patent No.: US 12,105,633 B2
(45) Date of Patent: Oct. 1, 2024

(54) ELECTRONIC DEVICE AND METHOD FOR ACCELERATING MEMORY ACCESS

(71) Applicant: Shanghai Zhaoxin Semiconductor Co., Ltd., Shanghai (CN)

(72) Inventors: Qunyi Yang, Beijing (CN); Yang Jiao, Beijing (CN); Jin Xiang, Xi'an (CN); Tingli Cui, Xi'an (CN); Xinglin Gui, Xi'an (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 1 day.

(21) Appl. No.: 18/047,791

(22) Filed: Oct. 19, 2022

(65) Prior Publication Data

US 2023/0128405 A1 Apr. 27, 2023

(51) Int. Cl.
*G06F 12/0862* (2016.01)
*G06F 12/0882* (2016.01)

(52) U.S. Cl.
CPC ...... *G06F 12/0882* (2013.01); *G06F 12/0862* (2013.01); *G06F 2212/7201* (2013.01)

(58) Field of Classification Search
CPC ............ G06F 12/0882; G06F 12/0862; G06F 2212/7201
USPC ........................................................ 711/118
See application file for complete search history.

(56) References Cited

U.S. PATENT DOCUMENTS

| | | | |
|---|---|---|---|
| 6,611,883 B1 * | 8/2003 | Avery | G06F 13/28 710/52 |
| 10,657,067 B1 * | 5/2020 | Azad | G06F 12/1036 |
| 10,713,190 B1 * | 7/2020 | Arbel | G06F 12/0862 |
| 2005/0216642 A1 * | 9/2005 | Lee | G06F 12/0292 710/308 |
| 2006/0149949 A1 * | 7/2006 | Ukai | G06F 9/3844 712/E9.06 |
| 2006/0248279 A1 * | 11/2006 | Al-Sukhni | G06F 12/0862 711/111 |
| 2008/0209130 A1 * | 8/2008 | Kegel | G06F 12/1081 711/135 |
| 2011/0173396 A1 * | 7/2011 | Sugumar | G06F 12/0862 709/212 |
| 2013/0128405 A1 * | 5/2013 | Lee | H02H 7/0852 361/103 |
| 2013/0339650 A1 * | 12/2013 | Alexander | G06F 12/0862 711/205 |
| 2014/0281351 A1 * | 9/2014 | Topp | G06F 12/1027 711/205 |

(Continued)

*Primary Examiner* — Christopher B Shin
(74) *Attorney, Agent, or Firm* — McClure, Qualey & Rodack, LLP

(57) ABSTRACT

An electronic device is provided. The electronic device includes a memory and an integrated circuit. The integrated circuit includes an address remapping unit. The memory includes multiple memory pages. The integrated circuit converts multiple virtual addresses into multiple physical addresses in sequence. The address remapping unit prefetches a first physical address corresponding to a first virtual address if a second virtual address exceeds a preset offset. The first virtual address is in a different memory page from the second virtual address. The second virtual address is currently processed. The multiple virtual addresses include the first and second virtual addresses.

12 Claims, 3 Drawing Sheets

(56) References Cited

U.S. PATENT DOCUMENTS

| | | | |
|---|---|---|---|
| 2015/0339233 A1* | 11/2015 | Kapil | G06F 12/10 |
| | | | 711/137 |
| 2017/0344482 A1* | 11/2017 | Kumar | G06F 12/1027 |
| 2023/0102006 A1* | 3/2023 | Beard | G06F 12/1009 |
| | | | 711/203 |
| 2023/0128405 A1* | 4/2023 | Yang | G06F 12/0882 |
| | | | 711/118 |

* cited by examiner

ELECTRONIC DEVICE AND METHOD FOR ACCELERATING MEMORY ACCESS

CROSS REFERENCE TO RELATED APPLICATIONS

This application claims the benefit of China Application 202111232517.X, filed on Oct. 22, 2021, the entirety of which is/are incorporated by reference herein.

BACKGROUND

Technical Field of

The present application relates to an electronic device, and, in particular, to an electronic device and a method for accelerating memory access.

DESCRIPTION OF THE RELATED ART

In computing systems, the speed of direct memory access (DMA) is directly related to the performance of external devices. In a system supporting hardware virtualization, the transmission corresponding to each DMA request requires the participation of remapping hardware to convert virtual addresses to physical addresses. In order to improve performance, a cache is set in the remapping hardware. Once the cache misses, the remapping hardware needs to access the memory many times to complete the conversion. With the existing architecture, the first DMA request for every 4K bytes (corresponding to one memory page) may result in a cache miss, so the transmission efficiency between the memory and the external devices is reduced, which is a problem that needs to be solved.

BRIEF SUMMARY

In order to solve the above-mentioned problem, the present application discloses an electronic and a method for accelerating memory access.

An embodiment of the present application provides an electronic device including a memory and an integrated circuit. The memory includes multiple memory pages. The integrated circuit converts multiple virtual addresses into multiple physical addresses in sequence. The integrated circuit includes an address remapping unit. The address remapping unit prefetches a first physical address corresponding to a first virtual address if a second virtual address exceeds a preset offset. The first virtual address is in a different memory page from the second virtual address. The second virtual address is currently processed. The multiple virtual addresses include the first and second virtual addresses.

The present application also provides a method for accelerating memory access. The memory includes multiple memory pages. The method includes the following steps. Multiple virtual addresses are received. The multiple virtual addresses are converted into multiple physical addresses in sequence. A first physical address corresponding to a first virtual address is prefetched if a second virtual address exceeds a preset offset. Wherein the first virtual address is in a different memory page from the second virtual address, the second virtual address is currently processed, and the multiple virtual addresses include the first and second virtual addresses.

BRIEF DESCRIPTION OF THE DRAWINGS

The present application may be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the present application.

DETAILED DESCRIPTION

Certain words are used to refer to specific elements in the specification and the claims. Those with ordinary knowledge in the technical field should understand that hardware manufacturers may use different terms to refer to the same component. The specification and the claims of the present application do not use differences in names as a way to distinguish elements, but use differences in functions of elements as a criterion for distinguishing. The "comprise" and "include" mentioned in the entire specification and the claims are open-ended terms, so they should be interpreted as "including but not limited to". "Generally" means that within an acceptable error range, a person with ordinary knowledge in the technical field may solve the technical problem within a certain error range, and achieve the technical effect. In addition, the term "coupled" herein includes any direct and indirect electrical connection means. Therefore, if it is described in the text that a first device is coupled to a second device, it means that the first device may be directly electrically connected to the second device, or indirectly electrically connected to the second device through other devices or connecting means. The following descriptions are preferred ways to implement the present application. The purpose is to illustrate the spirit of the present application and not to limit the scope of protection of the present application.

The following description is the best embodiment expected of the present application. These descriptions are used to illustrate the general principles of the present application and should not be used to limit the present application. The protection scope of the present application should be determined by referring to the scope of the claims of the present application.

Figure 1:
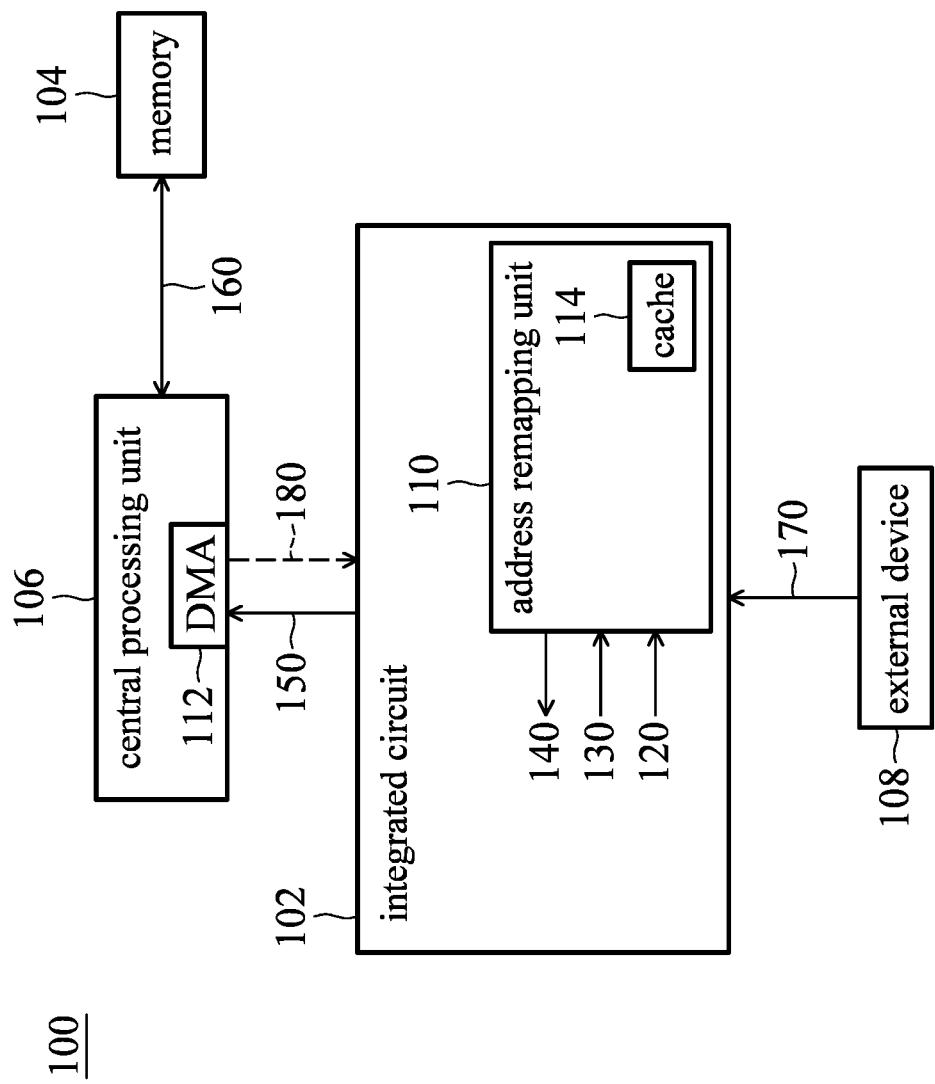
FIG. 1 is a schematic diagram of an electronic device 100 in accordance with some embodiments of the present application.

FIG. 1 is a schematic diagram of an electronic device 100 in accordance with some embodiments of the present application. As shown in FIG. 1, the electronic device 100 includes an integrated circuit 102, a memory 104, a central processing unit 106, and an external device 108. The integrated circuit 102 includes an address remapping unit 110, which includes a cache 114 and is used to convert a virtual address to a physical address. The uncore (not shown in FIG. 1) of the central processing unit 106 includes a direct-memory-access (DMA) unit 112.

In some embodiments, the electronic device 100 may be, for example, a laptop, desktop, a tablet, a smart mobile device, or a workstation server. In some embodiments, the integrated circuit 102, the memory 104, and the central processing unit 106 are disposed in the electronic device 100 in the form of independent chips. In some embodiments, the integrated circuit 102, the memory 104, and the central processing unit 106 are disposed in the same integrated chip, such as a system-on-chip (SoC), but the present application is not limited thereto. The external device 108 may be any functional chip that may communicate with the central processing unit 106 (e.g., through the integrated circuit 102) through its input and output ports. In some embodiments, the memory 104 is a volatile memory (e.g., a dynamic random access memory, a static random access memory, etc.) or a non-volatile memory (e.g., a programmable read-only memory, a flash memory, etc.). The integrated circuit 102 may be a Northbridge chip, or a chip set integrating the Northbridge chip.

In some embodiments, the memory 104 includes multiple memory pages, and the size of each memory page is 4K bytes. Limited by the size of each memory page of the memory 104, the number of physical addresses included in each memory page does not exceed 4K. Since the virtual addresses and the physical addresses of the memory 104 correspond to each other, the number of the virtual addresses corresponding to the physical addresses of each memory page also does not exceed 4K. It is noted that the size of the memory page is 4K bytes is just an example; the size of a memory page may be other values, such as 8K bytes or 16K bytes, etc.

As shown in FIG. 1, the integrated circuit 102 receives multiple access requests 170 with multiple virtual addresses from the external device 108, wherein each of the multiple access requests 170 includes a virtual address. The integrated circuit 102 then converts the multiple virtual addresses into multiple physical addresses in sequence by using the address remapping unit 110, and generates multiple direct-memory-access (DMA) requests 150 according to the multiple physical addresses, wherein each of the multiple DMA requests 150 has a physical address. The integrated circuit 102 then sends the multiple DMA requests 150 with the multiple physical addresses to the DMA unit 112 of the uncore of the central processing unit 106. Then, the DMA unit 112 checks if the physical addresses in the multiple DMA requests 150 hit the first level cache (L1 cache) and/or the second level cache (L2 cache) of the central processing unit 106, and write the hit cacheline into the memory 104 if a cache hit occurs. Then, the DMA unit 112 send a notification 180 to the integrated circuit 102 to notify the integrated circuit 102 to transmit data between the memory 104 and the external device 108 according to the multiple DMA requests 150 with the multiple physical addresses. As to how does the DMA unit 112 write the hit cacheline into the memory 104 or how does the integrated circuit 102 transmit data between the memory 104 and the external device 108, which is known to the person skilled in the art and is not detailed herein.

Figure 2:
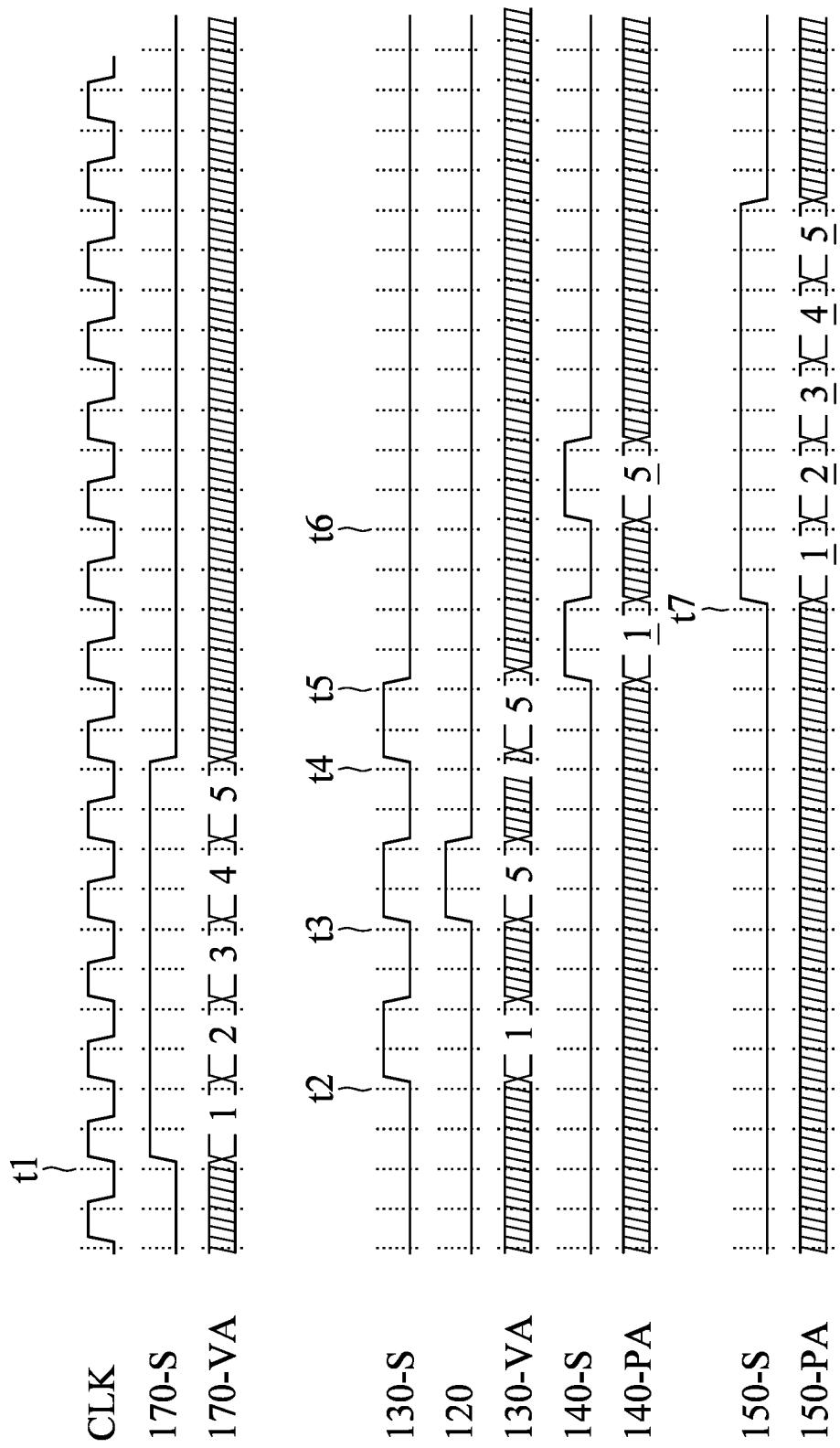
FIG. 2 is a signal-timing waveform diagram when the electronic device 100 in FIG. 1 is under operation in accordance with some embodiments of the present application.

The following describes how the integrated circuit 102 converts the multiple virtual addresses into multiple physical addresses in sequence by using the address remapping unit 110 with reference to FIGS. 1 and 2.

For the sake of description, we assume that the multiple virtual addresses included in the multiple access requests 170 are a virtual address 1, a virtual address 2, a virtual address 3, a virtual address 4, and a virtual address 5. And the values of the virtual addresses 1 to 5 are VA[x:12]+offset1[11:0], VA[x:12]+offset2[11:0], VA[x:12]+offset3[11:0], VA[x:12]+offset4[11:0], and VA[x:12]+4K+offset5[11:0], respectively. Moreover, we assume that the address value ranges from virtual addresses 1 to 5 in ascending order. It is well known to the person skilled in the art, each of the VA[x:12] and VA[x:12]+4K is an base address of a virtual address, which is also called the address of a memory page. Each of the offset1[11:0] to offset5[11:0] is an offset in the memory page. For example, the offset1[11:0] is the difference value between the virtual address 1 and the address of the first byte of the memory page in which the virtual address 1 locates. The x is the highest bit of a virtual address, for example, if the width of a virtual address is 32, x is 31. The 4K in VA[x:12]+4K denotes the size of a memory page. If the difference value between two addresses of first byte of memory pages is 4K, the two memory pages is adjacent.

According to the base addresses of the above-mentioned virtual addresses 1 to 5, the virtual addresses 1 to 4 are all in the same memory page (because their base addresses are all VA[x:12]). For example, we assume that the virtual addresses 1 to 4 are all in the first page. The virtual address 5 is in the next page of the first page, because the base address of the virtual address 5 is VA[x:12]+4K. For example, we assume that the virtual address 5 is in the second page.

As shown in FIG. 1 after receiving the multiple virtual addresses carried in the multiple access requests 170, the integrated circuit 102 sends the multiple virtual addresses one-by-one to the address remapping unit 110 for converting. Take converting one virtual address as an example, the integrated circuit 102 sends a remapping request 130 with a virtual address of the multiple virtual addresses to the address remapping unit 110. Then, the address remapping unit 110 obtains a physical address corresponding to the virtual address from the cache 114 or the memory 104. In one embodiment, the address remapping unit 110 first determines whether the physical address corresponding to the virtual address exists in the cache 114. If the physical address corresponding to the virtual address does not exist in the cache 114 (that is cache miss), the address remapping unit 110 obtains the physical address from the memory 104 according to the virtual address. If the physical address corresponding to the virtual address exists in the cache 114 (that is cache hit), the address remapping unit 110 directly obtains the physical address from the cache 114 according to the virtual address. In one embodiment, the address remapping unit 110 uses the virtual address as a tag to traverse the cache 114 and obtain the associated physical address from the cache 114.

After obtaining the physical address corresponding to the virtual address, the address remapping unit 110 generates a remapping response 140 according to the physical address, and sends the remapping response 140 to the integrated circuit 102. The integrated circuit 102 then may get the physical address from the remapping response 140. The integrated circuit 102 generates a DMA request according to the physical address. As mentioned above, after getting all the multiple physical addresses corresponding to the multiple virtual addresses, the integrated circuit 102 generates multiple DMA requests 150, which are sent to the DMA unit 112 of the uncore of the central processing unit 106. By setting a remapping prefetch request signal 120, the integrated circuit 102 enables the address remapping unit 110 to prefetch a physical address corresponding to a virtual address that is in a different memory page from the virtual address being currently processed if the offset of the virtual address that is currently processed exceeds a preset offset. As an example, we assume that the preset offset is 4K+400, which denotes an offset 400 in a 4K-bytes memory page. And we assume the offset1[11:0] is 200, the offset2[11:0] is 350, the offset3[11:0] is 450, the offset4[11:0] is 550, and the offset5[11:0] is 100, so the virtual addresses 1-5 are VA[x:12]+200, VA[x:12]+350, VA[x:12]+450, VA[x:12]+550, and VA[x:12]+4K+100. The 400, 200, 350, 450, 550 and 100 are hexadecimal numbers. As aforementioned, the virtual addresses 1 to 4 are all in the first page, and the virtual address 5 is in the second page, which is the next page of the first page. In one embodiment, when the multiple virtual addresses are not in the same memory page, the integrated circuit 102 enables the address remapping unit 110 to prefetch a physical address corresponding to a virtual address that is in a different memory page from the virtual address being currently processed if the offset of the virtual address that is currently processed exceeds a preset offset.

FIG. 2 is a signal-timing waveform diagram when the electronic device 100 in FIG. 1 is under operation in accordance with some embodiments of the present application. Please refer to FIG. 1 and FIG. 2 at the same time. FIG. 2 illustrates the timing waveform diagram of a clock signal (CLK), the access request signal 170-S and the virtual addresses 170-VA, wherein the access request signal 170-S and the virtual address 170-VA are parts of the multiple access requests 170. FIG. 2 also illustrates the remapping request signal 130-S, and the virtual address 130-VA, which are parts of the remapping request 130. FIG. 2 also illustrates a remapping prefetch request signal 120, a remapping response signal 140-S, and a physical address 140-PA, wherein the remapping response signal 140-S and the physical address 140-PA are parts of the remapping response 140. FIG. 2 also illustrates a direct-memory-access (DMA) request signal 150-S, and a physical address 150-PA, which are parts of the multiple DMA requests 150. We assume that the cache 114 in FIG. 1 is empty before time t1.

As shown in FIG. 2, the external device 108 sends the multiple access requests 170 carrying multiple virtual addresses to the integrated circuit 102 at time t1. Specifically, the external device 108 sets the access request signal 170-S, and maintains five cycles from time t1. At the same time, the value of the virtual address 170-VA are set to the virtual addresses 1 to 5 by the external device 108.

After receiving the multiple access requests 170 with the virtual addresses 1 to 5 from the external device 108, a control logic (not shown in FIG. 1) of the integrated circuit 102 first determines whether the virtual addresses 1 to 5 are in the same memory page. As mentioned above, since the virtual addresses 1 to 4 are in the same memory page in the memory 104 (as above-mentioned, the first page), and the virtual address 5 is in another memory page in the memory 104 (as above-mentioned, the second page), the virtual addresses 1 to 5 are not all in the same memory page.

At time t2, the integrated circuit 102 processes the virtual address 1. Specifically, the integrated circuit 102 first determines whether the virtual address 1 exceeds a preset offset. Because the offset of the virtual address 1 (that is 200) is less than the preset offset (that is 4K+400, which means an offset 400), the virtual address 1 does not exceed the preset offset. Therefore, there is no need to prefetch the physical address corresponding to the virtual address 5, which is a virtual address that is in a different memory page (e.g., the second page) from the virtual address being currently processed (that is the virtual address 1, which is in the first page). Then, the integrated circuit 102 sends a remapping request 130 with the virtual address 1 to the address remapping unit 110 for converting the virtual address 1 to a physical address at time t2. Because the physical address corresponding to the virtual address 1 does not exist in the cache 114, the address remapping unit 110 needs to obtain the physical address corresponding to the virtual address 1 from the memory 104, which needs 4 cycles in this embodiment. After obtaining the physical address corresponding to the virtual address 1, the address remapping unit 110 sends a remapping response 140 with the physical address corresponding to the virtual address 1 to the integrated circuit 102 at time t5. The integrated circuit 102 may store the virtual address 1 and the corresponding physical address in an internal storage (e.g., a register, not shown in FIG. 1) for converting the other virtual addresses, which are in a same memory page as the virtual address 1. As shown in FIG. 2, at time t2, the remapping request signal 130-S is set and the value of the virtual address 130-VA is the virtual address 1. At time t5, the remapping response signal 140-S is set and the value of the physical address 140-PA is the physical address corresponding to the virtual address 1.

Then, the integrated circuit 102 processes the virtual address 2. Specifically, the integrated circuit 102 first determines whether the virtual address 2 exceeds a preset offset. Because the offset of the virtual address 2 (that is 350) is less than the preset offset (that is 4K+400, which means an offset 400), the virtual address 2 does not exceed the preset offset. Therefore, there is no need to prefetch the physical address corresponding to the virtual address 5, which is a virtual address that is in a different memory page from the virtual address being currently processed (that is the virtual address 2). Furthermore, since the virtual addresses 1 and 2 are in the same memory page, the physical address of the virtual address 2 may be generated according to the physical address of the virtual address 1. There is no need to let the address remapping unit 110 to convert the virtual address 2 to a physical address. As to how to generate the physical addresses corresponding to the virtual address 2 according to the physical address corresponding to the virtual address 1, it is known to the person skilled in the art and is not detailed herein.

At time t3, the integrated circuit 102 processes the virtual address 3. Specifically, the integrated circuit 102 first determines whether the virtual address 3 exceeds a preset offset. Because the offset of the virtual address 3 (that is 450) is greater than the preset offset (that is 4K+400, which means an offset 400), the virtual address 3 exceeds the preset offset. Therefore, there is need to prefetch the physical address corresponding to the virtual address 5, which is a virtual address that is in a different memory page from the virtual address being currently processed (that is the virtual address 3). That is, in the present application, it is needed to prefetch the physical address corresponding to the virtual address 5 (which is located in the second page) from the memory 104 when processing the virtual address 3 (which is located in the first page) for future use. The integrated circuit 102 enables the address remapping unit 110 to prefetch the physical address corresponding to the virtual address 5 by sending the remapping prefetch request signal 120 and the remapping request 130 carrying the virtual address 5 to the address remapping unit 110 at time t3. As shown in FIG. 2, at time t3, the remapping prefetch request signal 120 and the remapping request signal 130-S are set, and the value of the virtual address 130-VA is the virtual address 5.

After receiving the remapping prefetch request signal 120, the remapping request signal 130-S and the virtual address 5, the address remapping unit 110 first determines whether the physical address corresponding to the virtual address 5 exists in the cache 114. If the physical address corresponding to the virtual address 5 exists in the cache 114 (that is cache hit), the address remapping unit 110 does nothing. If the physical address corresponding to the virtual address 5 does not exist in the cache 114 (that is cache miss), the address remapping unit 110 obtains the physical address from the memory 104 according to the virtual address 5. After obtaining the physical address corresponding to the virtual address 5, the address remapping unit 110 stores the physical address and the virtual address 5 in the cache 114. It is noted that since this is a prefetch operation, there is no need to send the physical address corresponding to the virtual address 5 to the integrated circuit 102. In one embodiment, when an error occurs during prefetching physical address from the memory 104, the address remapping unit 110 needs to ignore the error. In other words, since the prefetch request is not a remapping request, the address remapping unit 110 does not need to report the error occurred during prefetching to the software (e.g., the driver of the north bridge, etc.).

On the other hand, at time t3, since the virtual addresses 1 and 3 are in the same memory page, the physical address of the virtual address 3 may be generated according to the physical address of the virtual address 1, which is stored in the internal storage of the integrated circuit 102. There is no need to inform the address remapping unit 110 to convert the virtual address 3 to a physical address.

Then, the integrated circuit 102 processes the virtual address 4. Specifically, the integrated circuit 102 first determines whether the virtual address 4 exceeds a preset offset. Because the offset of the virtual address 4 (that is 550) is greater than the preset offset (that is 4K+400, which means an offset 400), the virtual address 4 exceeds the preset offset. It is noted, although the virtual address 4 exceeds the preset offset, because the integrated circuit 102 has already informed the address remapping unit to prefetch the physical address corresponding to the virtual address 5 (at time t3), there is no need to prefetch it from the memory 104 again. Furthermore, since the virtual addresses 1 and 4 are in the same memory page, the physical address of the virtual address 4 may be generated according to the physical address of the virtual address 1. There is no need to let the address remapping unit 110 to convert the virtual address 4 to a physical address.

At time t4, the integrated circuit 102 processes the virtual address 5. Specifically, the integrated circuit 102 first determines whether the virtual address 5 exceeds a preset offset. Because the offset of the virtual address 5 (that is 100) is less than the preset offset (that is 4K+400, which means an offset 400), the virtual address 5 does not exceed the preset offset. Therefore, there is no need to prefetch the physical address corresponding to a virtual address of another memory page, which is a virtual address that is in a different memory page from the virtual address being currently processed (that is the virtual address 5). In addition, since the virtual address 5 is not in the memory page in which the virtual addresses 1-4 is, the physical address of the virtual address 5 may not be generated according to the physical address of the virtual address 1. There is need to inform the address remapping unit 110 to convert the virtual address 5 to a physical address. Then, the integrated circuit 102 sends a remapping request 130 with the virtual address 5 to the address remapping unit 110 at time t4. As mentioned above, because the physical address corresponding to the virtual address 5 exists in the cache 114, the address remapping unit 110 may obtain the physical address corresponding to the virtual address 5 from the cache 114 (other than from the memory 104), which only needs 1 cycle in this embodiment. After obtaining the physical address corresponding to the virtual address 5, the address remapping unit 110 sends a remapping response 140 with the physical address corresponding to the virtual address 5 to the integrated circuit 102 at time t6. As shown in FIG. 2, at time t4, the remapping request signal 130-S is set and the value of the virtual address 130-VA is the virtual address 5. At time t6, the remapping response signal 140-S is set and the value of the physical address 140-PA is the physical address corresponding to the virtual address 5.

As previously mentioned, because the physical address corresponding to the virtual address 5 has been prefetched from the memory 104 and stored in the cache 114 in advance, the integrated circuit 102 may directly get the physical address corresponding to the virtual address 5 from the cache 114 in less time (only need to wait 1 cycle but not 4 cycles in this embodiment). So that the transmission efficiency is improved.

At time t7, the integrated circuit 102 sends the multiple direct-memory-access (DMA) requests 150 with the multiple physical addresses corresponding to the virtual addresses 1 to 5 to the DMA unit 112 of the uncore of the central processing unit 106. As shown in FIG. 2, the integrated circuit 102 sets the DMA request signal 150-S, and maintains five cycles from time t7. At the same time, the value of the physical address 150-PA is the physical addresses corresponding to the virtual addresses 1 to 5. After receiving the physical addresses corresponding to the virtual addresses 1 to 5, the DMA unit 112 will do further processing which has been described previously and is not repeated here again.

In some embodiments, the preset offset is set according to the latency of reading data from the memory 104, and the preset offset may be 4K+600, 4K+800, 4K+a00, 4K+c00, or 4K+e00. The 600, 800, a00, c00 and e00 are hexadecimal numbers.

Figure 3:
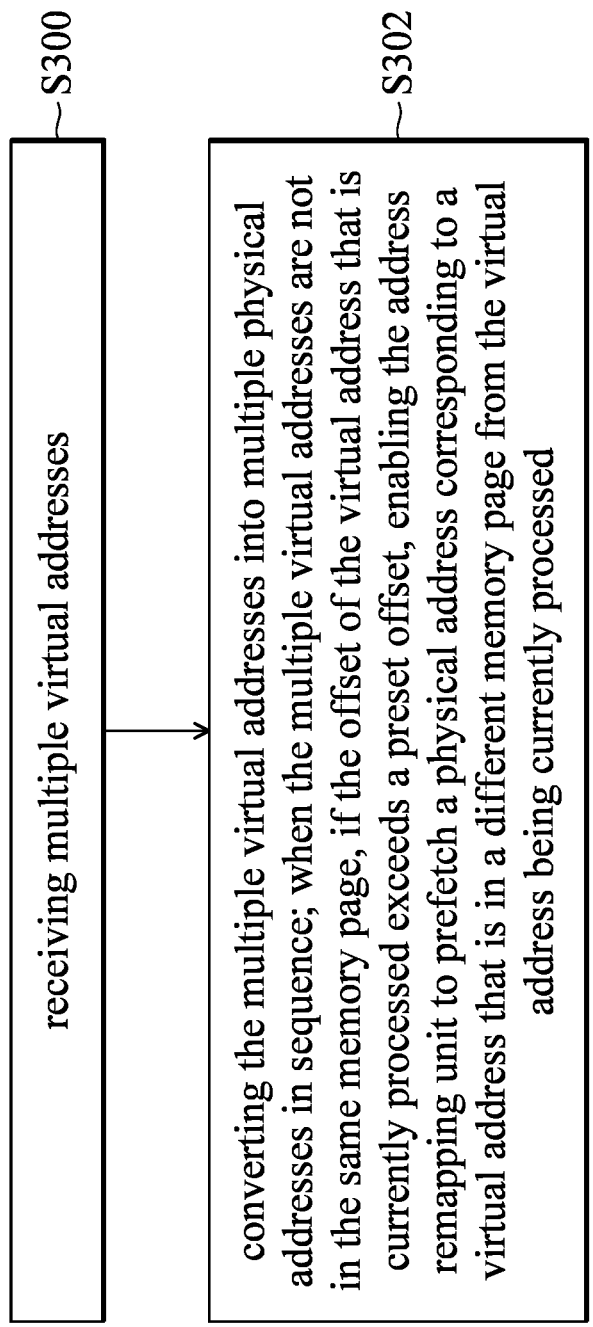
FIG. 3 is a flow chart of an acceleration method for accessing a memory in accordance with some embodiments of the present application.

FIG. 3 is a flow chart of an acceleration method for accessing a memory in accordance with some embodiments of the present application. The acceleration method for accessing the memory described in FIG. 3 is used to improve the transmission efficiency between the external device 108 and the memory 104. Firstly, the integrated circuit 102 receives multiple virtual addresses from the external device 108 (step S300). Then, the integrated circuit 102 converts the multiple virtual addresses into multiple physical addresses in sequence by using the address remapping unit 110. When the multiple virtual addresses are not in the same memory page, if the offset of the virtual address that is currently processed exceeds a preset offset, the integrated circuit 102 enables the address remapping unit 110 to prefetch a physical address corresponding to a virtual address that is in a different memory page from the virtual address being currently processed (step S302). The details of the steps S300 and S302 has been described previously and is not repeated here again.

The electronic device 100 and the acceleration method for accessing the memory of the present application may improve the conversion speed from a virtual address to a physical address, which improves the transmission efficiency between the memory 104 and the external device 108.

Although the present application is disclosed above in the preferred embodiment, it is not intended to limit the scope of the present application. Anyone with ordinary knowledge in the relevant technical field may make changes and modifications without departing from the spirit and scope of the present application. Therefore, the protection scope of the present application shall be determined by the scope of the claims.

What is claimed is:

1. An electronic device, comprising:
a memory, comprising multiple memory pages;
an integrated circuit, converting multiple virtual addresses into multiple physical addresses in sequence; wherein the integrated circuit comprises:
an address remapping unit, prefetching a first physical address corresponding to a first virtual address if a second virtual address exceeds a preset offset, wherein the first virtual address is in a different memory page from the second virtual address, the second virtual address is currently processed, the multiple virtual addresses include the first and second virtual addresses;
wherein the preset offset is set according to latency of reading data from the memory.

2. The electronic device as claimed in claim 1, further comprising a memory, wherein the address remapping unit comprises a cache, when the second virtual address exceeds the preset offset, the integrated circuit set a remapping prefetch request signal to enable the address remapping unit to prefetch the first physical address from the memory, the address remapping unit stores the first physical address into the cache.

3. The electronic device as claimed in claim 2, wherein when the integrated circuit notifies the address remapping unit to convert the first virtual address into the first physical address, the address remapping unit directly obtains the first physical address from the cache according to the first virtual address, and then sends the first physical address to the integrated circuit.

4. The electronic device as claimed in claim 1, further comprising a memory, wherein when the integrated circuit notifies the address remapping unit to convert the second virtual address into a second physical address, the address remapping unit obtains the second physical address from the memory according the second virtual address, and then sends the second physical address to the integrated circuit.

5. The electronic device as claimed in claim 4, wherein the integrated circuit generates a third physical address corresponding to a third virtual address according to the second physical address, wherein the third virtual address and the second virtual address is in the same memory page, and the third virtual address is one of the multiple virtual addresses.

6. The electronic device as claimed in claim 5, wherein after the integrated circuit converts the multiple virtual addresses into the multiple physical addresses, the integrated circuit sends multiple direct-memory-access requests to the central processing unit; wherein the multiple direct-memory-access request comprise the multiple physical addresses.

7. The electronic device as claimed in claim 1, wherein the size of a memory page of the multiple memory pages is 4K bytes, and the preset offset is 4K+400, 4K+600, 4K+800, 4K+a00, 4K+c00, or 4K+e00, wherein the 400, 600, 800, a00, c00, and e00 are hexadecimal numbers, the 4K+400 denotes an offset 400 in a 4K-bytes memory page, the 4K+600 denotes an offset 600 in a 4K-bytes memory page, the 4K+800 denotes an offset 800 in a 4K-bytes memory page, the 4K+a00 denotes an offset a00 in a 4K-bytes memory page, the 4K+c00 denotes an offset c00 in a 4K-bytes memory page, the 4K+e00 denotes an offset e00 in a 4K-bytes memory page.

8. The electronic device as claimed in claim 1, wherein if an offset of the second virtual address is greater than the preset offset, the second virtual address exceeds the preset offset, wherein the preset offset is an offset in a memory page.

9. An acceleration method for accessing a memory, wherein the memory comprises multiple memory pages, the method comprising:
receiving multiple virtual addresses;
converting the multiple virtual addresses into multiple physical addresses in sequence;
prefetching a first physical address corresponding to a first virtual address if a second virtual address exceeds a preset offset, wherein the first virtual address is in a different memory page from the second virtual address, the second virtual address is currently processed, the multiple virtual addresses include the first and second virtual addresses;
setting the preset offset according to latency of reading data from the memory.

10. The acceleration method as claimed in claim 9, further comprising:
setting a remapping prefetch request signal to enable the address remapping unit to prefetch the first physical address from the memory when the second virtual address exceeds the preset offset;
storing the first physical address into a cache.

11. The acceleration method as claimed in claim 10, further comprising:
directly obtaining the first physical address from the cache according to the first virtual address after receiving a notification that converts the first virtual address into the first physical address; and
returning the first physical address.

12. The acceleration method as claimed in claim 9, wherein if an offset of the second virtual address is greater than the preset offset, the second virtual address exceeds the preset offset, wherein the preset offset is an offset in a memory page.

* * * * *